US007152721B2

United States Patent
Goto et al.

(10) Patent No.: US 7,152,721 B2
(45) Date of Patent: Dec. 26, 2006

(54) ELECTRONIC LOCKING CLUTCH HAVING A NON-MAGNETIC SLEEVE

(75) Inventors: Shiro Goto, Plymouth, MI (US); Russell Monahan, Ann Arbor, MI (US); Thomas Houtman, Ann Arbor, MI (US)

(73) Assignee: NJN Corporation, Osaka (JP)

( * ) Notice: Subject to any disclaimer, the term of this patent is extended or adjusted under 35 U.S.C. 154(b) by 156 days.

(21) Appl. No.: 10/980,038

(22) Filed: Nov. 3, 2004

(65) Prior Publication Data

US 2006/0090977 A1 May 4, 2006

(51) Int. Cl.
*B60K 23/08* (2006.01)
(52) U.S. Cl. .......................... 192/35; 192/44; 192/84.8
(58) Field of Classification Search ................. None
See application file for complete search history.

(56) References Cited

U.S. PATENT DOCUMENTS 5,924,510 A    7/1999  Itoh et al.
6,769,524 B1 *  8/2004  Yasui et al. .................... 192/35
6,790,153 B1 *  9/2004  Goto .......................... 475/150
6,834,750 B1 * 12/2004  Baker et al. ................... 192/44
6,846,257 B1 *  1/2005  Baker et al. ................... 475/5

FOREIGN PATENT DOCUMENTS

JP          11099843 A  *  4/1999

* cited by examiner

*Primary Examiner*—Saul Rodriguez
(74) *Attorney, Agent, or Firm*—Brinks Hofer Gilson & Lione

(57) ABSTRACT

An over-running clutch is provided having an outer race and an inner race defining a varying gap therebetween. A plurality of rolling elements are positioned between the inner and outer races and are interconnected by a retainer. A rotor is secured to the outer race by a non-magnetic sleeve. An armature is rotationally locked to the retainer. Mounted onto the rotor and adapted to produce an electromagnetic flux to attract the armature into contact with the rotor is an electromagnetic coil; wherein rotation of the outer race is frictionally transferred to the armature and the retainer, thereby moving the rollers such that the rollers engage and wedge between the inner and outer races to lock the clutch.

35 Claims, 4 Drawing Sheets

ELECTRONIC LOCKING CLUTCH HAVING A NON-MAGNETIC SLEEVE

TECHNICAL FIELD OF THE INVENTION

This invention is related to a two way over-running clutch, preferably for use in automotive differential or transfer case applications. More specifically, the present invention relates to a two-way over-running clutch assembly of a roller/ramp variety which includes a rotor that is supported by a non-magnetic sleeve.

BACKGROUND OF THE INVENTION

Referring to FIG. 1, an example of previous over-running clutches of this type is shown generally at 100. The clutch 100 includes an inner race 120, and outer race 112, a plurality of rolling elements 126 positioned therebetween, and an electromagnetic coil 144 adapted to generate a flux that causes the rolling elements 126 to lock the inner race 120 and outer race 112 to one another, thereby locking the clutch 100. A portion 102 of the outer race 112 extends axially to provide support for a rotor 136 that envelopes and the electromagnetic coil 144 that is mounted on a housing.

Due to the large forces that the inner and outer races 120, 112 experience, the outer race 112 is typically made from steel. The portion 102 of the outer race 112 that extends axially to provide support for the rotor 136 adds more steel to the clutch 100, thereby making the clutch 100 heavier. Further, steel is generally magnetically conductive. Using the portion 102 of the steel outer race 112 to support the rotor 136 creates the possibility that the flux generated by the electromagnetic coil 144 will leak or short-circuit through the outer race 112, thereby degrading or impeding the performance of the clutch 100.

Therefore, there is a need for an electromagnetic clutch assembly that supports the rotor and electromagnetic coil while allowing the clutch assembly to be lighter and reducing the chance that the electromagnetic flux will leak or short-circuit through the outer race.

BRIEF SUMMARY OF THE INVENTION

In accordance with an aspect of the present invention, an over-running clutch assembly comprises an outer race having a cylindrical inner surface and being rotatable about an axis, an inner race having an outer surface coaxial with the cylindrical inner surface and defining a gap therebetween.

The inner race is also rotatable about the axis, with rotational movement relative to the outer race also being possible. A plurality of ramp surfaces are formed at spaced apart locations on the outer surface of the inner race. Positioned between the outer race and the inner race are a plurality of rollers with one of the rollers being located centrally within each of the ramped surfaces and with each of the rollers having a diameter less than the gap between the center of the ramp surfaces on the inner race and the cylindrical inner surface of the outer race.

A retainer interconnects all of the rollers and causes the rollers to circumferentially move in unison with one another. The retainer is rotatable about the axis, with limited relative rotation being possible with respect to the inner race. Additionally, a first biasing element is supported on the retainer to circumferentially bias the retainer into a position relative to the inner race such that each of the rollers is held in the center of the ramped surfaces on the inner race.

A rotor is rotationally secured to the outer race such that the rotor rotates along with the outer race. Disposed between the retainer and the rotor, an armature includes a plurality of openings formed therein and located radially thereabout. Retainer tabs of the retainer extend axially to engage the openings such that the armature is rotationally locked to the retainer while allowing limited axial movement of the armature relative to the retainer.

An electromagnetic coil is mounted to the stationary housing and adjacent to the rotor and is adapted to produce an electromagnetic flux that will magnetically attract the armature into contact with the rotor. Upon contact, rotation of the outer race is frictionally transferred to the armature and the retainer, thereby moving the rollers along the ramp surfaces to a position where the rollers engage and wedge between the inner and outer races and prevent relative rotation between the inner and outer races. To reduce the size and weight of the outer race and to reduce the possibility that the magnetic flux will short circuit through the outer race, a non-magnetic sleeve is positioned between and interconnects the rotor and the outer race.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

The following description of the preferred embodiment of the invention is not intended to limit the scope of the invention to this preferred embodiment, but rather to enable any person skilled in the art to make and use the invention.

Figure 1:
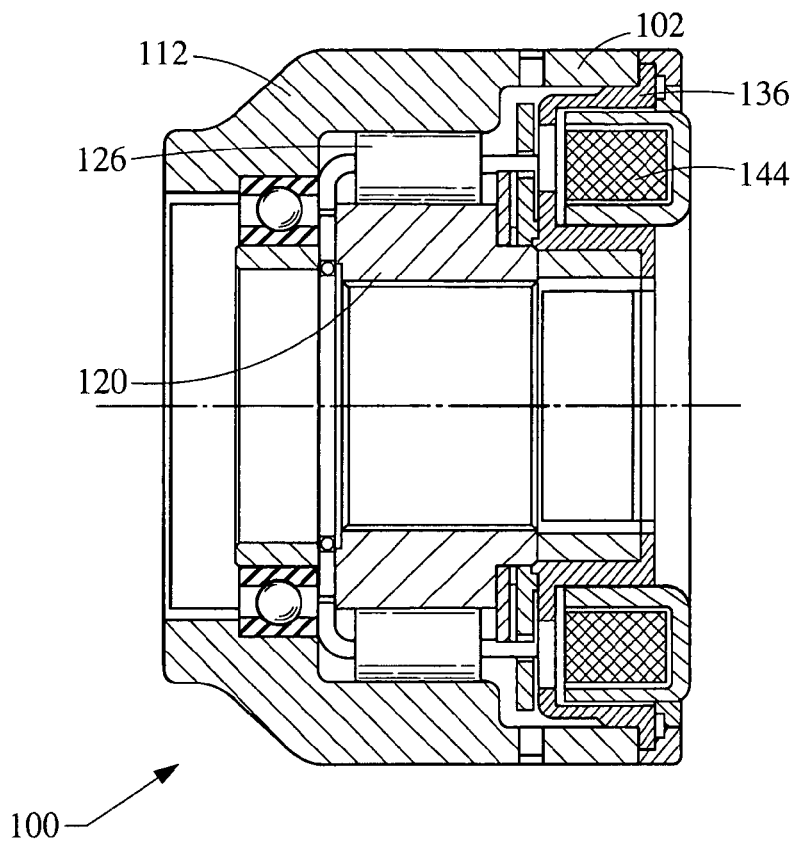
FIG. 1 is a sectional view of a prior art over-running clutch assembly.
Figure 2:
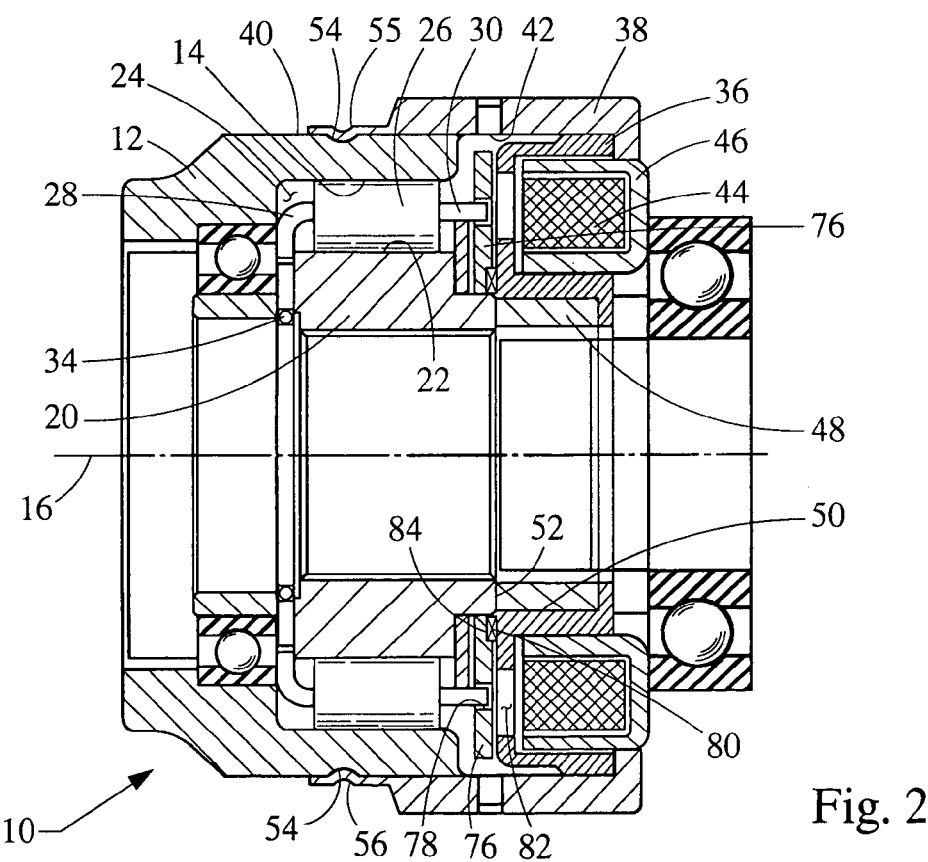
FIG. 2 is a sectional view of a first embodiment of the over-running clutch of the present invention.

Referring to FIG. 2, an over-running clutch of the present invention is shown generally at 10. The over-running clutch 10 includes an outer race 12 that is rotatable about a first axis 16 and has an inner surface 14. An inner race 20 includes an outer surface 22 coaxial with the inner surface 14 of the outer race 12. The inner surface 14 of the outer race 12 and the outer surface 22 of the inner race 20 define a gap 24 between the inner race 20 and the outer race 12 Positioned within the gap 24 are a plurality of rolling elements 26.

Preferably, the rolling elements 26, the inner race 20 and the outer race 12 are made from steel. Due to the high hertzian contact stresses experienced, the rolling elements 26, the inner surface 14 of the outer race 12 and the outer surface 22 of the inner race 20, and the rolling elements 26 are also preferably hardened and ground.

Figure 8:
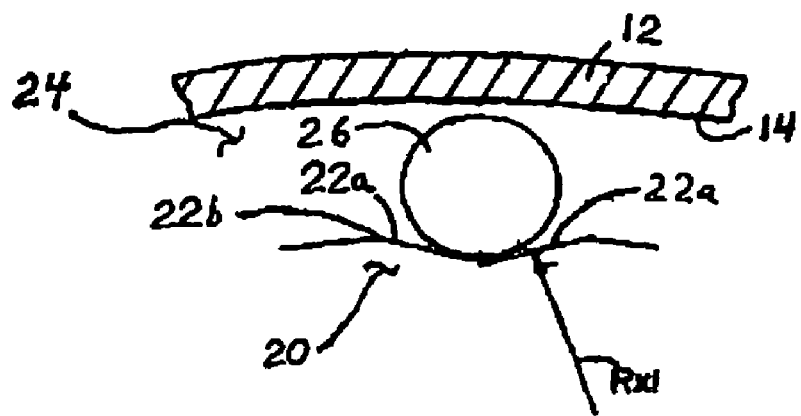
FIG. 8 is a sectional view similar to FIG. 4 showing an outer surface of an inner race engaging a rolling element according to one embodiment of the present invention.

As best shown in FIG. 8, the outer surface 22 of the inner race 20 is defined by a plurality of adjacent ramp surface 22a, that are preferably planar and oriented perpendicular to radii Rxi drawn from the axis of rotation. Provided this way, the gap 24 has a maximum dimension at the midpoint of the ramp surface 22a and a minimum dimension at the juncture 22b between two adjacent surfaces. The rolling elements 26 are positioned between the outer race 12 and the inner race 20 with one rolling element 26 being located at a midpoint of each ramp surfaces 22a of the inner race 20. The rolling elements 26 have a diameter which is smaller than the gap 24 between the inner surface 14 and the midpoint of the ramp surfaces 22a of the outer surface 22, but greater than the gap 24 between the juncture 22b between adjacent ramp surfaces 22a and the inner surface 14 of the outer race 12.

A retainer 28 interconnects all of the rolling elements 26 and causes the rolling elements 26 to circumferentially move in unison with one another. The retainer 28 is rotatable about the first axis 16 with limited relative rotation with respect to the inner race 20. The retainer 28 also includes at least one retainer tab 30 extending axially from the retainer.

A first biasing element 34 is mounted onto the retainer 28 to maintain the position of the retainer 28 with respect to the inner race 20 such that the rolling elements 26 are normally held at the midpoints of the ramp surfaces.

A rotor 36 is rotationally secured to the outer race 12 by a sleeve 38. The sleeve 38 is non-magnetic and is secured to an outer surface 40 of the outer race 12, with the rotor 36 being secured to an inner surface 42 of the non-magnetic sleeve 38. The non-magnetic sleeve 38 is accordingly located between and interconnects the rotor 36 to the outer race 12. Because an end portion of the outer race 12 is not required to support the rotor 36, the non-magnetic sleeve 38 allows the outer race 12 to be designed smaller and lighter.

The rotor 36 itself surrounds an electromagnetic coil 44 and coil housing 46, the former of which is adapted to produce an electromagnetic flux. The use of the non-magnetic sleeve 38 to support the rotor 36 on the outer race 12 prevents this flux from leaking or short-circuiting through the outer race 12. Preferably, the non-magnetic sleeve 38 is made from aluminum or other suitable non-magnetic material. A sleeve bearing 48 is positioned within an inner diameter 50 of the rotor 36 and abuts a back face 52 of the inner race 20 to axially position the rotor 36 within the over-running clutch 10.

The non-magnetic sleeve 38 is mounted onto the outer diameter 40 of the outer race 12 such that the non-magnetic sleeve 38 is rotationally and axially fixed to the outer race 12. In a first embodiment, the outer surface 40 of the outer race 12 has dimples 54 formed therein. Portions 55 of the non-magnetic sleeve 38 correspondingly formed and received into the dimples 54 to rotationally and axially fix the non-magnetic sleeve 38 to the outer surface 40 of the outer race 12, as shown in FIG. 2.

Figure 3:
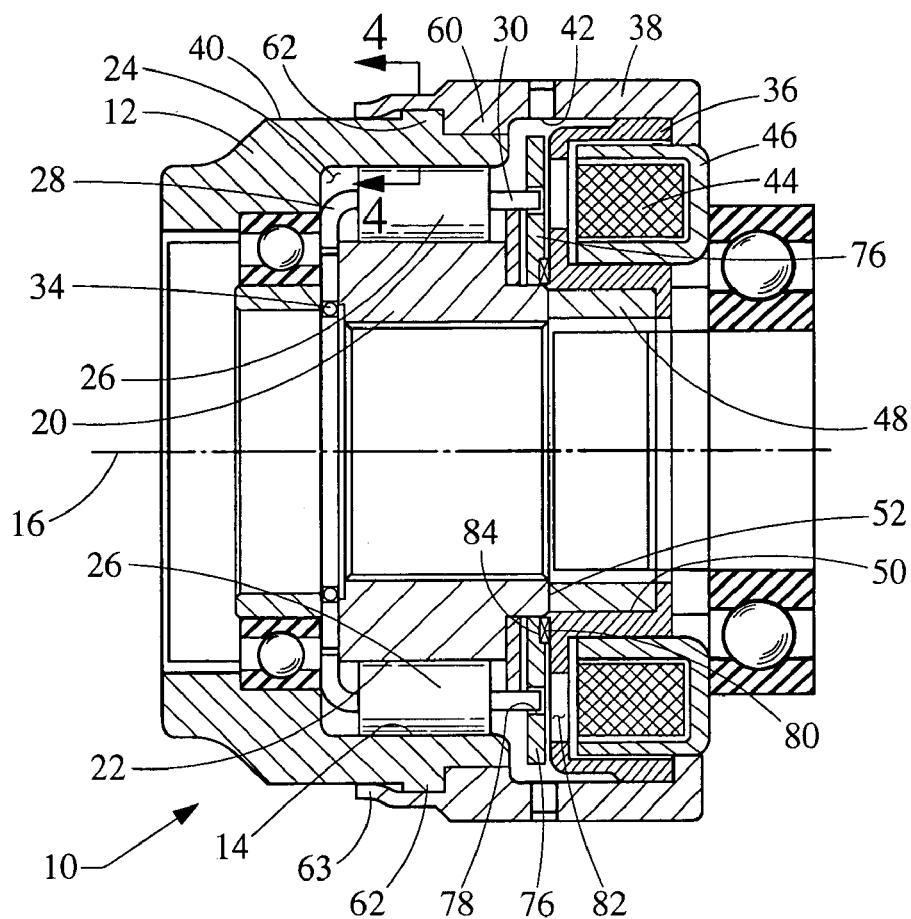
FIG. 3 is a sectional view of a second embodiment of the over-running clutch of the present invention.
Figure 4:
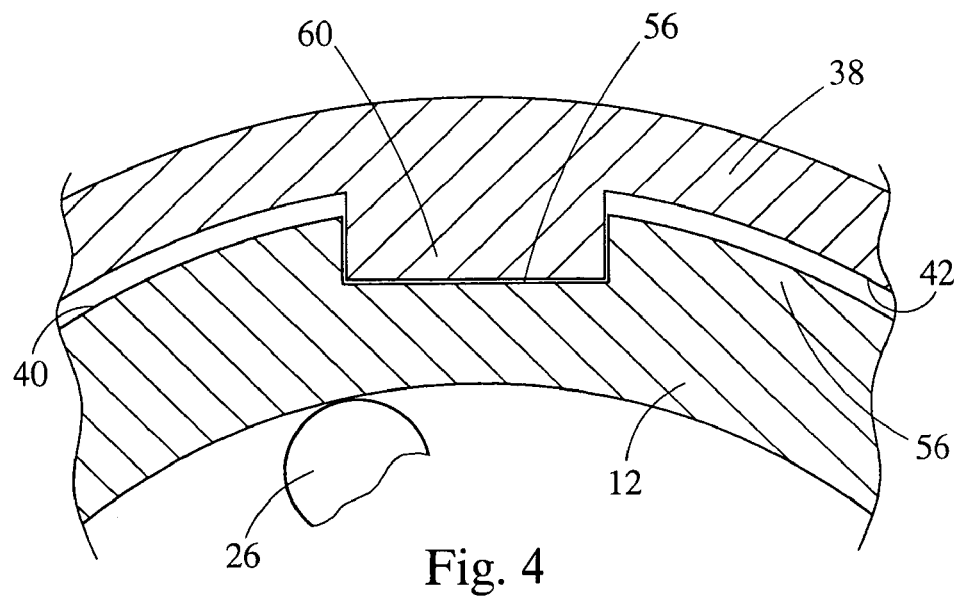
FIG. 4 is a sectional view taken generally along line 4—4 of FIG. 3.

Referring to FIGS. 3 and 4, in a second embodiment, the outer surface 40 of the outer race 12 is provided with recesses 56 that extend radially inward. The inner surface 42 of the non-magnetic sleeve 38 includes corresponding lugs 60 extend radially inward and received within the recesses 56. The recesses 56 of the outer race 12 and the lugs 60 of the non-magnetic sleeve 38 engage one another to rotationally fix the non-magnetic sleeve 38 to the outer race 12. The outer surface 40 of the outer race 12 further includes a radial ridge 62 extending circumferentially around the outer race 12. Portions of the non-magnetic sleeve 38 are formed into a lip 63 defining an inner diameter that is less than the outer diameter of the ridge 62. The lip 63 is located on an end of the sleeve 38 so as to be positioned or snap over the radial ridge 62 to axially fix the non-magnetic sleeve 38 to the outer race 12. The lugs 60 can be replaced with separate "keys" which fit into the slots 56 in the outer surface 40 and new slots in the inner surface 42 of the non-magnetic sleeve 38.

Figure 5:
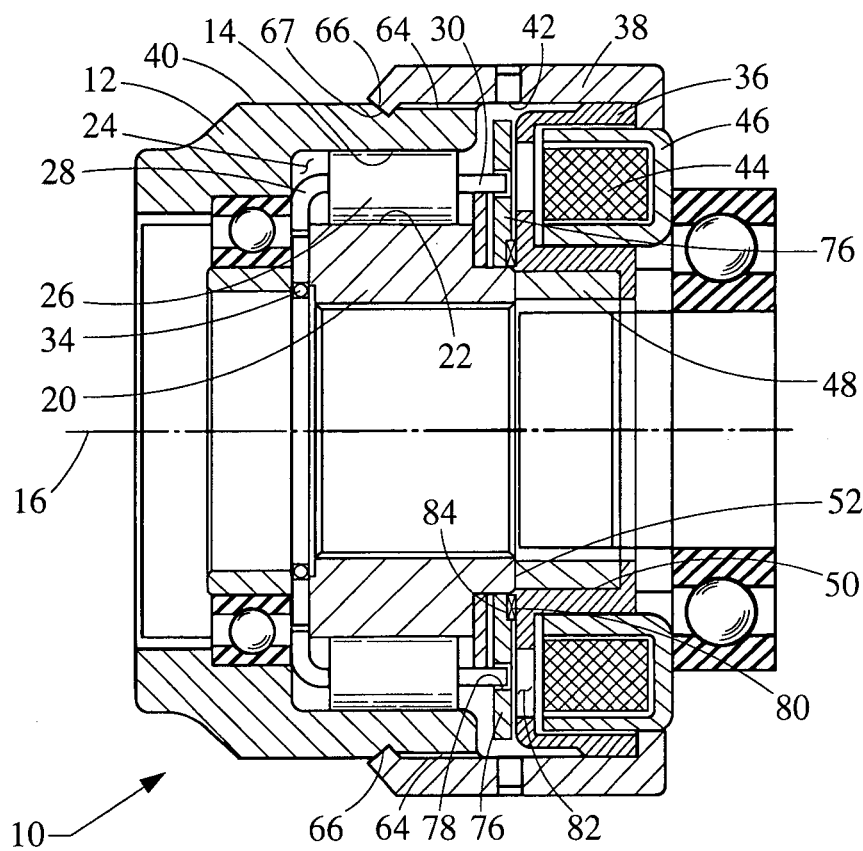
FIG. 5 is a sectional view of a third embodiment of the over-running clutch of the present invention.

In a third embodiment, the outer diameter 40 of the outer race 12 includes a cutting spline 64 formed therein. The cutting spline 64 engages the inner diameter 42 of the non-magnetic sleeve 38 to rotationally lock the non-magnetic sleeve 38 onto the outer race 12, as shown in FIG. 5. The outer surface 40 of the outer race 12 further includes a circumferentially extending groove 66 formed therein. Portions 67 of the non-magnetic sleeve 38 are formed radially inward and received into the groove 66 to axially lock the non-magnetic sleeve 38 to the outer race 12.

Figure 6:
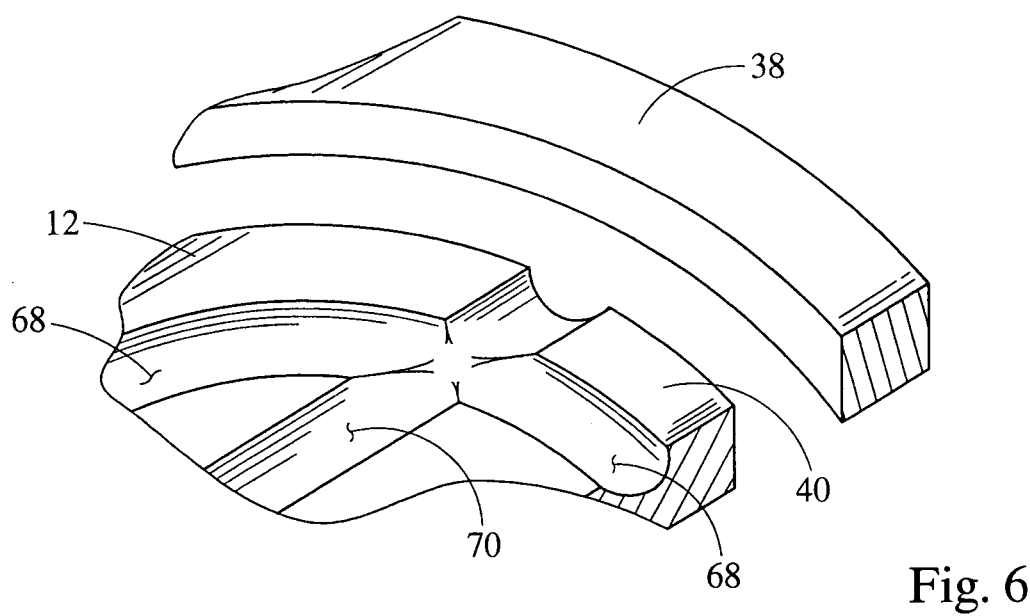
FIG. 6 is a perspective view of a portion of the outer diameter of the outer race of a fourth embodiment of the over-running clutch of the present invention.
Figure 7:
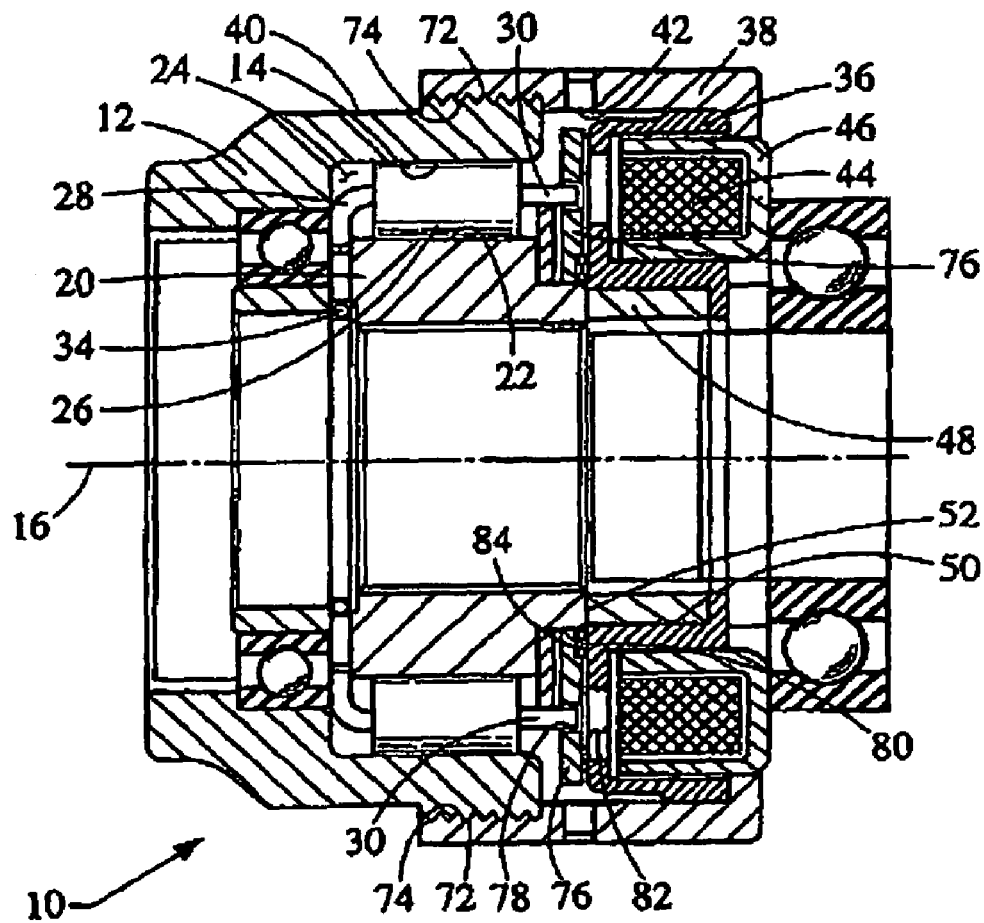
FIG. 7 is a sectional view of a fifth embodiment of the over-running clutch of the present invention.

Referring to FIG. 6, in a fourth embodiment the outer surface 40 of the outer race 12 includes a first or radial groove 68 extending circumferentially around the outer surface 40 and a plurality of axially extending second or axial grooves 70 are circumferentially spaced about the outer surface 40. Portions of the non-magnetic sleeve 38 are formed so as to extend or are deformed to extend into the first and second grooves 68, 70 to both rotationally and axially lock the non-magnetic sleeve 38 onto the outer race 12.

In a fifth embodiment, the non-magnetic sleeve 38 is screwed onto the outer surface 40 of the outer race 12. In this fifth embodiment, the outer surface 40 of the outer race 12 includes external screw threads 72 formed thereon. The inner surface 42 of the non-magnetic sleeve 38 includes internal screw threads 74 formed therein. The non-magnetic sleeve 38 is screwed onto the outer diameter 40 of the outer race 12 to both rotationally and axially lock the non-magnetic sleeve 38 to the outer race 12. Once the non-magnetic sleeve 38 is screwed onto the outer race 12, the material of the non-metallic sleeve 38 can be staked or otherwise deformed in such a way to prevent the non-metallic sleeve 38 from coming loose or disengaging therefrom.

In all the embodiments, an armature 76 is disposed between the retainer 28 and the rotor 36. The armature 76 includes at lease one opening 78 therein that receives the retainer tab 30 to rotationally couple the armature 76 to the retainer 28. The opening 78 within the armature 76 is large enough to allow the retainer tab 30 to slide axially therein such that the armature 76 is rotationally linked to the retainer 28, but the armature 76 is allowed to move axially with respect to the retainer 28.

A second biasing element 80 is disposed between the armature 76 and the rotor 36 to bias the armature 76 away from the rotor 36 and toward the retainer 28. Preferably, the second biasing element 80 is a wave spring.

Preferably, the first biasing element 34 is a centering spring supported by the inner race 20 and engaging the retainer 28 to keep the retainer 28 in position and to keep the rolling elements 26 positioned at the midpoints of the ramp surfaces 23 of the inner race 20, thereby allowing the outer race 12 and the inner race 20 to rotate freely with respect to one other. The first biasing element 34 further includes a plurality of tangs (not shown) extending radially in or out to engage notches (not shown) on the retainer 28. The biasing force of the first biasing element 34 must be carefully calibrated for the over-running clutch 10 and must provide enough force to move the retainer 28 and rolling elements 26 to the neutral position (mid-point) easily when the over-running clutch 10 is disengaged, but not so much force that friction between the armature 76 and the rotor 36 cannot overcome it to actuate the clutch 10.

As mentioned above, the electromagnetic coil 44 is adapted to generate a magnetic flux. The rotor 36 includes a plurality of partially circumferential slots 82 extending through the rotor 36 and spaced circumferentially about the rotor 36. When energized, the electromagnetic coil 44 produces a magnetic flux which is focused around the slots 82 and concentrated on the armature 76. When the magnetic flux passes through the armature 76, the armature 76 is magnetically drawn toward the rotor 36. Once the magnetic force of the electromagnetic coil 44 overcomes the force of the second biasing element 80, the armature 76 will start to move toward the rotor 36.

The armature 76 is free to move axially with respect to the retainer 28, so, when the attractive force of the electromagnetic coil 44 overcomes the force of the second biasing element 80, the armature 76 will move axially toward the rotor 36 until the armature 76 and the rotor 36 come into contact with one another. When the armature 76 and the rotor 36 are brought into contact with one another, the frictional force between the outer race 12 and the armature 76 will force the armature 76 to rotate with the rotor 36 and the outer race 12. The armature 76 is rotationally linked to the retainer 28; therefore, the rotational movement of the outer race 12 will be transferred through the armature 76 to the retainer 28.

Rotational movement of the retainer 28 with respect to the inner race 20 moves the rolling elements 26 along the ramp surfaces until the rolling elements 26 are no longer positioned at the midpoints of the ramp surfaces. Since the gap 24 is not large enough to accommodate the diameter of the rolling elements 26 when the rolling elements 26 move out of the midpoints of the ramp surfaces, the rolling elements 26 become wedged between the outer surface 22 of the inner race 20 and the inner surface 14 of the outer race 12, thereby rotationally locking the inner race 20 and outer race 12 together. The ramp surfaces and the interaction of the ramp surfaces with the rolling elements 26 are described in detail in U.S. Pat. Nos. 5,927,456 and 5,924,510, which are hereby incorporated by reference.

When the electromagnetic coil 44 is de-energized, the magnetic attraction of the armature 76 to the rotor 36 dissipates. As this attraction dissipates, the second biasing element 80 quickly overcomes the magnetic attraction and forces the armature 76 back away from the rotor 36, thereby eliminating the frictional transfer of rotation to the armature 76.

Without a rotational force to pull the retainer 28 and rolling elements 26 out of the neutral position, the first biasing element 34 will force the retainer 28 back into the neutral position and the rolling elements 26 back into the middle of the ramp surfaces, thereby allowing the outer race 12 to rotate freely with respect to the inner race 20, and un-locking the over-running clutch 10.

Preferably, the armature 76 includes an annular step 84 extending around the inner diameter of the armature 76. The annular step 84 faces the rotor 36, and provides a recess into which the second biasing element 80 is piloted and can collapse when the armature 76 is drawn into contact with the rotor 36. Preferably, the second biasing element 80 is a wave spring that fits within the annular step 84 on the armature 76 and collapses within the annular step 84 when the magnetic force of the electromagnetic coil 44 exceeds the spring force of the second biasing element 80.

The foregoing discussion discloses and describes various aspects of the invention. One skilled in the art will readily recognize from such discussion, and from the accompanying drawings and claims, that changes and modifications can be made to the invention without departing from the fair scope of the invention as defined in the following claims. The invention has been described in an illustrative manner, and it is to be understood that the terminology which has been used is intended to be in the nature of words of description rather than of limitation.

The invention claimed is:

1. An over-running clutch comprising:
   an outer race having an inner surface and being rotatable about a first axis;
   an inner race being coaxial with said outer race and having an outer surface defining a gap between said outer surface and said inner surface, said inner race being rotatable about said first axis with allowable rotational movement relative to said outer race;
   a plurality of adjacent ramp surfaces formed circumferentially about one of said outer surface and said inner surface, said ramp surfaces having a midpoint and opposing end portions;
   a plurality of rolling elements positioned between said outer race and said inner race, said rolling elements having a diameter that is less than a first gap portion of the gap between said outer surface and said inner surface, the first gap being at one of said midpoint of said ramp surfaces and said opposing end portions of said ramp surfaces, and said diameter being greater than a second gap portion of the gap between said inner surface and said outer surface, the second gap being at the other of said midpoint of said ramp surfaces and said end portions of said ramp surfaces;
   a retainer interconnecting all of said rolling elements and causing said rolling elements to move in unison with one another, said retainer being rotatable about said first axis, said retainer including a plurality of retainer tabs extending axially from said retainer;
   a rotor coupled to said outer race such that said rotor rotates with said outer race;
   a non-magnetic sleeve positioned between and interconnecting said rotor with said outer race, said sleeve having portions retainingly engaging corresponding portions on said outer race such that said sleeve is mounted onto an outer surface of said outer race, and one of said outer surface of said outer race and an inner surface of said sleeve includes radially extending lugs and the other of said outer surface and said inner surface includes recesses corresponding to said lugs, and said outer surface of said outer race includes a radial circumferentially extending ridge around said outer race, wherein said lugs and said recesses are engaged and portions of said sleeve extend over said ridge thereby rotationally and axially locking said sleeve to said outer races;
   an armature disposed between said retainer and said rotor, said armature further including a plurality of openings formed therein and located circumferentially about said armature, said retainer tabs extending axially into said openings such that said armature is rotationally coupled to said retainer while allowing limited axial movement of said armature relative to said retainer; and
   an electromagnetic coil surrounded by said rotor, said electromagnetic coil adapted to produce an electromagnetic flux that magnetically attracts said armature into contact with said rotor whereby rotation of said outer race is frictionally transferred to said armature and said retainer thereby moving said rollers along said ramp surfaces to a position where said rollers engage and wedge between said inner and outer races to prevent relative rotation between said inner and outer races.

2. The over-running clutch of claim 1 wherein said rotor is mounted within an inner diameter of said sleeve such that said rotor is rotationally locked to said sleeve.

3. The over-running clutch of claim 1 wherein said outer surface of said outer race has dimples formed therein, portions of said sleeve being shaped and received into said dimples to rotationally and axially lock said sleeve to said outer surface of said outer race.

4. The over-running clutch of claim 1 wherein said outer diameter of said outer race includes a spline formed therein, said spline engaging an inner diameter of said sleeve to rotationally lock said non-magnetic sleeve onto said outer race.

5. The over-running clutch of claim 1 further including a first biasing element supported on said inner race to radially bias said retainer so as to hold each of said rolling elements at one of said midpoints of said ramp surfaces and said end points of said ramped surfaces when said clutch is not engaged.

6. The over-running clutch of claim 5 wherein said first biasing element is a centering spring held in place between said inner race and said retainer to bias said retainer into a neutral position.

7. The over-running clutch of claim 1 further including a second biasing element disposed between said armature and said rotor to bias said armature away from said rotor.

8. The over-running clutch of claim 7 wherein said armature further includes a recess formed therein, said second biasing element being a wave spring resting within said recess said recess providing a cavity into which said wave spring compresses when said armature is forced into contact with said rotor by said coil.

9. An over-running clutch comprising:
an outer race having an inner surface and being rotatable about a first axis;
an inner race being coaxial with said outer race and having an outer surface defining a gap between said outer surface and said inner surface, said inner race being rotatable about said first axis with allowable rotational movement relative to said outer race;
a plurality of adjacent ramp surfaces formed circumferentially about one of said outer surface and said inner surface, said ramp surfaces having a midpoint and opposing end portions;
a plurality of rolling elements positioned between said outer race and said inner race, said rolling elements having a diameter that is less than a first gap portion of the gap between said outer surface and said inner surface, the first gap being at one of said midpoint of said ramp surfaces and said opposing end portions of said ramp surfaces, and said diameter being greater than a second gap portion of the gap between said inner surface and said outer surface, the second gap being at the other of said midpoint of said ramp surfaces and said end portions of said ramp surfaces;
a retainer interconnecting all of said rolling elements and causing said rolling elements to move in unison with one another, said retainer being rotatable about said first axis, said retainer including a plurality of retainer tabs extending axially from said retainer;
a rotor coupled to said outer race such that said rotor rotates with said outer race;
a non-magnetic sleeve positioned between and interconnecting said rotor with said outer race, said outer race including an outer surface having a first groove formed therein extending circumferentially around said outer surface and a plurality of axially extending second grooves spaced circumferentially about said outer surface, said sleeve being mounted onto the outer surface of said outer race such that portions of said sleeve extend into said first and second grooves to rotationally and axially lock said sleeve onto said outer race;
an armature disposed between said retainer and said rotor, said armature further including a plurality of openings formed therein and located circumferentially about said armature, said retainer tabs extending axially into said openings such that said armature is rotationally coupled to said retainer while allowing limited axial movement of said armature relative to said retainer; and
an electromagnetic coil surrounded by said rotor, said electromagnetic coil adapted to produce an electromagnetic flux that magnetically attracts said armature into contact with said rotor whereby rotation of said outer race is frictionally transferred to said armature and said retainer thereby moving said rollers along said ramp surfaces to a position where said rollers engage and wedge between said inner and outer races to prevent relative rotation between said inner and outer races.

10. The over-running clutch of claim 9 wherein said rotor is mounted within an inner diameter of said sleeve such that said rotor is rotationally locked to said sleeve.

11. The over-running clutch of claim 9 wherein said outer surface of said outer race has dimples formed therein, portions of said sleeve being shaped and received into said dimples to rotationally and axially lock said sleeve to said outer surface of said outer race.

12. The over-running clutch of claim 9 wherein one of said outer surface of said outer race and an inner surface of said sleeve includes radially extending lugs and the other of said outer surface and said inner surface includes recesses corresponding to said lugs and engaging said lugs to rotationally locak said sleeve to said outer race.

13. The over-running clutch of claim 9 wherein said outer diameter of said outer race includes a spline formed therein, said spline engaging an inner diameter of said sleeve to rotationally lock said non-magnetic sleeve onto said outer race.

14. The over-running clutch of claim 9 further including a first biasing element supported on said inner race to radially bias said retainer so as to hold each of said rolling elements at one of said midpoints of said ramp surfaces and said end points of said ramped surfaces when said clutch is not engaged.

15. The over-running clutch of claim 14 wherein said first biasing element is a centering spring held in place between said inner race and said retainer to bias said retainer into a neutral position.

16. The over-running clutch of claim 9 further including a second biasing element disposed between said armature and said rotor to bias said armature away from said rotor.

17. The over-running clutch of claim 16 wherein said armature further includes a recess formed therein, said second biasing element being a wave spring resting within said recess said recess providing a cavity into which said wave spring compresses when said armature is forced into contact with said rotor by said coil.

18. An over-running clutch comprising:
an outer race having an inner surface and being rotatable about a first axis;
an inner race being coaxial with said outer race and having an outer surface defining a gap between said outer surface and said inner surface, said inner race being rotatable about said first axis with allowable rotational movement relative to said outer race;
a plurality of adjacent ramp surfaces formed circumferentially about one of said outer surface and said inner surface, said ramp surfaces having a midpoint and opposing end portions;
a plurality of rolling elements positioned between said outer race and said inner race, said rolling elements having a diameter that is less than a first gap portion of the gap between said outer surface and said inner surface, the first gap being at one of said midpoint of said ramp surfaces and said opposing end portions of said ramp surfaces, and said diameter being greater than a second gap portion of the gap between said inner surface and said outer surface, the second gap being at the other of said midpoint of said ramp surfaces and said end portions of said ramp surfaces;
a retainer interconnecting all of said rolling elements and causing said rolling elements to move in unison with one another, said retainer being rotatable about said first axis, said retainer including a plurality of retainer tabs extending axially from said retainer;
a rotor coupled to said outer race such that said rotor rotates with said outer race;
a non-magnetic sleeve positioned between and interconnecting said rotor with said outer race, said outer race including an outer surface having a groove formed therein extending circumferentially around said outer surface, said sleeve being mounted onto the outer surface of said outer race such that said sleeve is rotationally locked to said outer race, said sleeve including portions being shaped and received into said groove of said outer race to axially lock said sleeve to said outer race;
an armature disposed between said retainer and said rotor, said armature further including a plurality of openings formed therein and located circumferentially about said armature, said retainer tabs extending axially into said openings such that said armature is rotationally coupled to said retainer while allowing limited axial movement of said armature relative to said retainer; and
an electromagnetic coil surrounded by said rotor, said electromagnetic coil adapted to produce an electromagnetic flux that magnetically attracts said armature into contact with said rotor whereby rotation of said outer race is frictionally transferred to said armature and said retainer thereby moving said rollers along said ramp surfaces to a position where said rollers engage and wedge between said inner and outer races to prevent relative rotation between said inner and outer races.

19. The over-running clutch of claim 18 wherein said rotor is mounted within an inner diameter of said sleeve such that said rotor is rotationally locked to said sleeve.

20. The over-running clutch of claim 18 wherein said outer surface of said outer race has dimples formed therein, portions of said sleeve being shaped and received into said dimples to rotationally and axially lock said sleeve to said outer surface of said outer race.

21. The over-running clutch of claim 18 wherein one of said outer surface of said outer race and an inner surface of said sleeve includes radially extending lugs and the other of said outer surface and said inner surface includes recesses corresponding to said lugs and engaging said lugs to rotationally locak said sleeve to said outer race.

22. The over-running clutch of claim 18 wherein said outer diameter of said outer race includes a spline formed therein, said spline engaging an inner diameter of said sleeve to rotationally lock said non-magnetic sleeve onto said outer race.

23. The over-running clutch of claim 18 further including a first biasing element supported on said inner race to radially bias said retainer so as to hold each of said rolling elements at one of said midpoints of said ramp surfaces and said end points of said ramped surfaces when said clutch is not engaged.

24. The over-running clutch of claim 23 wherein said first biasing element is a centering spring held in place between said inner race and said retainer to bias said retainer into a neutral position.

25. The over-running clutch of claim 18 further including a second biasing element disposed between said armature and said rotor to bias said armature away from said rotor.

26. The over-running clutch of claim 25 wherein said armature further includes a recess formed therein, said second biasing element being a wave spring resting within said recess said recess providing a cavity into which said wave spring compresses when said armature is forced into contact with said rotor by said coil.

27. An over-running clutch comprising:
an outer race having an inner surface and being rotatable about a first axis;
an inner race being coaxial with said outer race and having an outer surface defining a gap between said outer surface and said inner surface, said inner race being rotatable about said first axis with allowable rotational movement relative to said outer race;
a plurality of adjacent ramp surfaces formed circumferentially about one of said outer surface and said inner surface, said ramp surfaces having a midpoint and opposing end portions;
a plurality of rolling elements positioned between said outer race and said inner race, said rolling elements having a diameter that is less than a first gap portion of the gap between said outer surface and said inner surface, the first gap being at one of said midpoint of said ramp surfaces and said opposing end portions of said ramp surfaces, and said diameter being greater than a second gap portion of the gap between said inner surface and said outer surface, the second gap being at the other of said midpoint of said ramp surfaces and said end portions of said ramp surfaces;
a retainer interconnecting all of said rolling elements and causing said rolling elements to move in unison with one another, said retainer being rotatable about said first axis, said retainer including a plurality of retainer tabs extending axially from said retainer;
a rotor coupled to said outer race such that said rotor rotates with said outer race;
a non-magnetic sleeve positioned between and interconnecting said rotor with said outer race, said sleeve including an inner diameter and being mounted onto an outer surface of said outer race, said outer surface having an external screw thread formed therein, said inner diameter having an internal screw thread formed therein, said inner diameter of said sleeve being threadably engaged onto said outer surface of said outer race to rotationally and axially lock said sleeve onto said outer race;

an armature disposed between said retainer and said rotor, said armature further including a plurality of openings formed therein and located circumferentially about said armature, said retainer tabs extending axially into said openings such that said armature is rotationally coupled to said retainer while allowing limited axial movement of said armature relative to said retainer; and an electromagnetic coil surrounded by said rotor, said electromagnetic coil adapted to produce an electromagnetic flux that magnetically attracts said armature into contact with said rotor whereby rotation of said outer race is frictionally transferred to said armature and said retainer thereby moving said rollers along said ramp surfaces to a position where said rollers engage and wedge between said inner and outer races to prevent relative rotation between said inner and outer races.

28. The over-running clutch of claim 27 wherein said rotor is mounted within an inner diameter of said sleeve such that said rotor is rotationally locked to said sleeve.

29. The over-running clutch of claim 27 wherein said outer surface of said outer race has dimples formed therein, portions of said sleeve being shaped and received into said dimples to rotationally and axially lock said sleeve to said outer surface of said outer race.

30. The over-running clutch of claim 27 wherein one of said outer surface of said outer race and an inner surface of said sleeve includes radially extending lugs and the other of said outer surface and said inner surface includes recesses corresponding to said lugs and engaging said lugs to rotationally locak said sleeve to said outer race.

31. The over-running clutch of claim 27 wherein said outer diameter of said outer race includes a spline formed therein, said spline engaging an inner diameter of said sleeve to rotationally lock said non-magnetic sleeve onto said outer race.

32. The over-running clutch of claim 27 further including a first biasing element supported on said inner race to radially bias said retainer so as to hold each of said rolling elements at one of said midpoints of said ramp surfaces and said end points of said ramped surfaces when said clutch is not engaged.

33. The over-running clutch of claim 32 wherein said first biasing element is a centering spring held in place between said inner race and said retainer to bias said retainer into a neutral position.

34. The over-running clutch of claim 27 further including a second biasing element disposed between said armature and said rotor to bias said armature away from said rotor.

35. The over-running clutch of claim 34 wherein said armature further includes a recess formed therein, said second biasing element being a wave spring resting within said recess said recess providing a cavity into which said wave spring compresses when said armature is forced into contact with said rotor by said coil.

* * * * *

UNITED STATES PATENT AND TRADEMARK OFFICE
CERTIFICATE OF CORRECTION

| | | |
|---|---|---|
| PATENT NO. | : 7,152,721 B2 | Page 1 of 1 |
| APPLICATION NO. | : 10/980038 | |
| DATED | : December 26, 2006 | |
| INVENTOR(S) | : Shiro Goto et al. | |

It is certified that error appears in the above-identified patent and that said Letters Patent is hereby corrected as shown below:

In column 1, item (73), delete "NJN" and substitute --NTN-- in its place.

Column 6, in claim 1, line 45, after "sleeve to said outer" delete "races" and substitute --race-- in its place.

Signed and Sealed this

Tenth Day of April, 2007

JON W. DUDAS
*Director of the United States Patent and Trademark Office*